US009951263B2

(12) United States Patent
Del Gaudio et al.

(10) Patent No.: US 9,951,263 B2
(45) Date of Patent: Apr. 24, 2018

(54) PROCESS FOR THE RECOVERY OF HEAVY OIL FROM AN UNDERGROUND RESERVOIR

(75) Inventors: Lucilla Del Gaudio, San Donato Milanese (IT); Claudio Riccardo Pratesi, San Donato Milanese (IT); Alessandra Belloni, Cerra Al Lambro (IT); Iole Moroni, Monticelli d'Ongina (IT)

(73) Assignee: ENI S.p.A., Rome (IT)

(*) Notice: Subject to any disclaimer, the term of this patent is extended or adjusted under 35 U.S.C. 154(b) by 1147 days.

(21) Appl. No.: 13/503,033

(22) PCT Filed: Oct. 15, 2010

(86) PCT No.: PCT/IB2010/002646
§ 371 (c)(1),
(2), (4) Date: Jul. 3, 2012

(87) PCT Pub. No.: WO2011/048459
PCT Pub. Date: Apr. 28, 2011

(65) Prior Publication Data
US 2012/0261120 A1 Oct. 18, 2012

(30) Foreign Application Priority Data
Oct. 20, 2009 (IT) .............. MI2009A1809

(51) Int. Cl.
*C09K 8/58* (2006.01)
*E21B 43/16* (2006.01)

(52) U.S. Cl.
CPC .............. *C09K 8/58* (2013.01); *E21B 43/16* (2013.01)

(58) Field of Classification Search
CPC ............ E21B 43/16; E21B 43/22; C09K 8/58
USPC ............. 166/270.1, 400, 268, 265, 266, 267
See application file for complete search history.

(56) References Cited

U.S. PATENT DOCUMENTS

| | | | | | |
|---|---|---|---|---|---|
| 3,871,453 | A | * | 3/1975 | Sarem ................. | C09K 8/58 166/270.1 |
| 3,885,628 | A | * | 5/1975 | Reed et al. ................ | 166/252.1 |
| 3,952,806 | A | * | 4/1976 | Trantham ................. | 166/294 |
| 4,121,661 | A | * | 10/1978 | Redford ................. | E21B 43/24 166/252.1 |
| 4,249,608 | A | * | 2/1981 | Carter ..................... | 166/275 |
| 4,265,308 | A | * | 5/1981 | Hedges et al. ............ | 166/252.3 |

(Continued)

FOREIGN PATENT DOCUMENTS

| | | |
|---|---|---|
| EP | 0 118 379 | 9/1984 |
| EP | 0 261 794 | 3/1988 |
| WO | WO 2007112967 A1 * | 10/2007 ........... A61K 9/1075 |

OTHER PUBLICATIONS

International Search Report dated Jan. 28, 2011 in PCT/IB10/02646 Filed Oct. 15, 2010.

*Primary Examiner* — Silvana C Runyan
(74) *Attorney, Agent, or Firm* — Oblon, McClelland, Maier & Neustadt, L.L.P.

(57) ABSTRACT

A process for the recovery of heavy oil from an underground reservoir, comprising: injecting an oil-in-water nanoemulsion into one or more injection wells; recovering said heavy oil from one or more production wells. Said process is particularly advantageous for enhancing the recovery of heavy oils from underground reservoirs within the range of technologies for tertiary recovery, usually known as "EOR" (Enhanced Oil Recovery").

44 Claims, 1 Drawing Sheet

(56) References Cited

U.S. PATENT DOCUMENTS

| | | | |
|---|---|---|---|
| 4,269,974 A * | 5/1981 | Wintersdorff | C08L 5/00 |
| | | | 426/589 |
| 4,359,391 A * | 11/1982 | Salathiel et al. | 507/277 |
| 4,458,760 A * | 7/1984 | Hurd | C09K 8/584 |
| | | | 166/269 |
| 4,472,291 A | 9/1984 | Rosano | |
| 4,706,749 A * | 11/1987 | Hayes et al. | 166/267 |
| 4,822,481 A * | 4/1989 | Taylor | 208/390 |
| 4,971,707 A | 11/1990 | Osterloh | |
| 5,186,257 A * | 2/1993 | Stahl et al. | 166/270.1 |
| 5,310,002 A * | 5/1994 | Blauch et al. | 166/307 |
| 6,054,496 A * | 4/2000 | Crane et al. | 518/702 |
| 6,291,406 B1 * | 9/2001 | Rose et al. | 507/239 |
| 2002/0125010 A1 * | 9/2002 | Collins et al. | 166/279 |
| 2003/0139299 A1 * | 7/2003 | Bragg et al. | 507/200 |
| 2006/0096758 A1 * | 5/2006 | Berry et al. | 166/291 |
| 2007/0125536 A1 * | 6/2007 | Acock et al. | 166/280.2 |
| 2007/0295368 A1 * | 12/2007 | Harrison et al. | 134/42 |
| 2010/0137168 A1 * | 6/2010 | Quintero et al. | 507/124 |

* cited by examiner

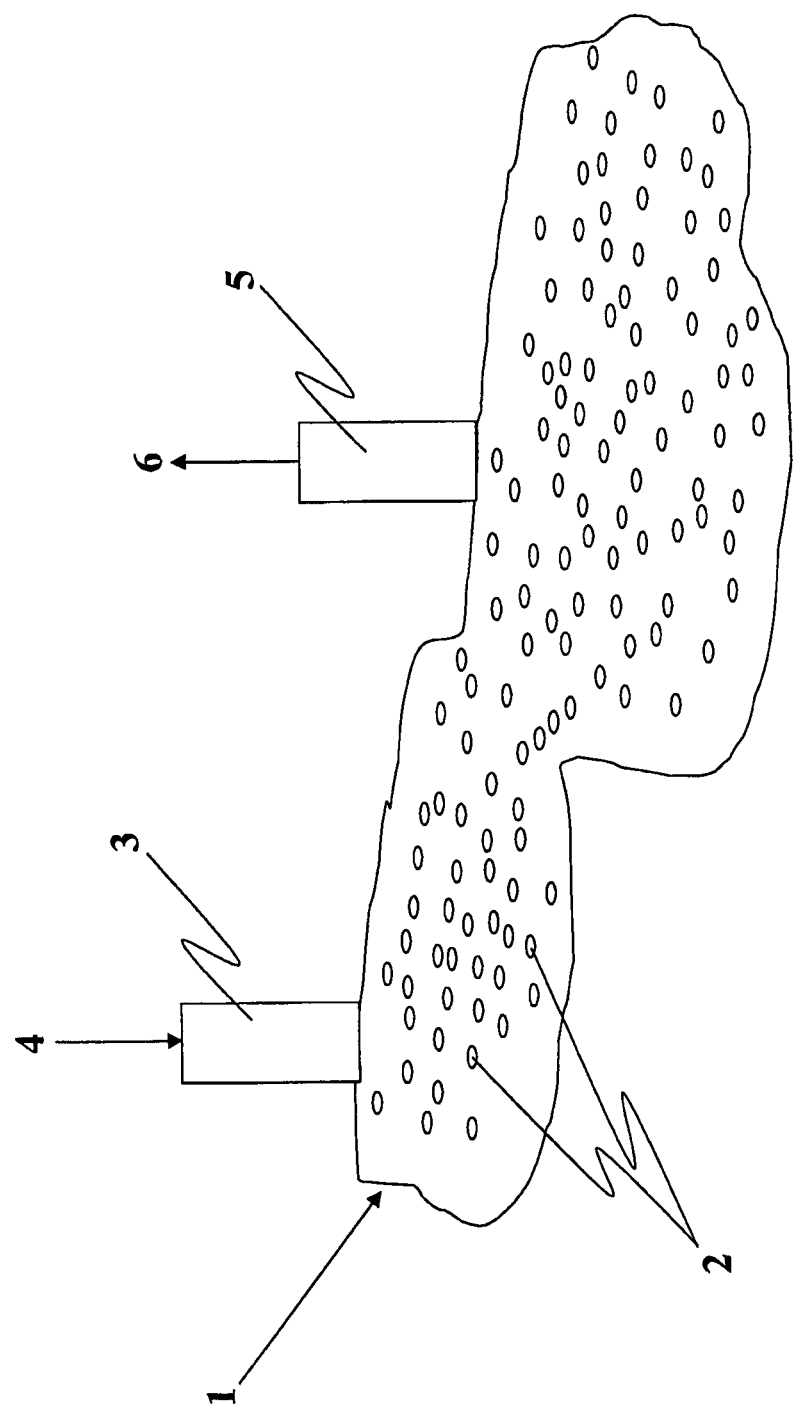

PROCESS FOR THE RECOVERY OF HEAVY OIL FROM AN UNDERGROUND RESERVOIR

The present invention relates to a process for the recovery of heavy oil from an underground reservoir.

More specifically, the present invention relates to a process for the recovery of heavy oil from an underground reservoir using an oil-in-water nanoemulsion.

Said process is particularly advantageous for enhancing the recovery of heavy oil from an underground reservoir within the range of technologies for tertiary recovery, usually known as "EOR" (Enhanced Oil Recovery").

It is known that the recovery of oil from underground reservoirs is normally carried out by means of oil wells. It is also known that this recovery is normally carried out in three distinct phases during which various recovery technologies are applied with the purpose of maintaining the production of crude oil at the highest levels. Said recovery technologies are known as: primary recovery, secondary recovery and tertiary recovery.

Underground reservoirs can have natural energy supplied, for example, by the water and/or the gases optionally present in said underground reservoirs, capable of helping the mobilization of the oil towards the surface of the same. Both water and gas can, in fact, exert a pressure capable of mobilizing the oil present in said underground reservoirs towards the surface of one or more production wells (primary recovery). This natural energy, however, becomes exhausted with time, with the result that the primary recovery normally allows the recovery of a small fraction of the oil present in the underground reservoirs (e.g., about 15-20% of the total oil originally present in said underground reservoirs).

The secondary recovery is normally carried out by the injection of water (water flooding), or gas (gas flooding), which are injected into said underground reservoirs for the purpose of maintaining a pressure in the same, which allows the oil to be mobilized towards their surface. By means of said secondary recovery, an additional 15-30% approximately of the total oil originally present in said underground reservoirs can be recovered, with respect to said primary recovery.

The amount of oil remaining in these underground reservoirs can be recovered by a tertiary recovery, usually known as "EOR" (Enhanced Oil Recovery"). Said tertiary recovery can be carried out, for example, by injecting fluids into said underground reservoirs which improve the mobility of the residual oil towards their surface. Said fluids can be selected, for example, from: gases which are miscible or non-miscible with said oil (normally carbon dioxide), vapour, air or oxygen, polymer solutions ("polymer flooding"), mixtures of surfactants and polymers ("surfactant-polymer flooding"), mixtures of bases, surfactants and polymers ("alkaline-surfactant-polymer flooding" or "ASP"), mixtures of microorganisms.

It is known that many factors such as, for example, the interfacial tension between the gas and/or the fluid injected and the residual oil, the relative mobility of the gas and/or of the fluid injected, the wettability characteristics of the surfaces of the rocks present in said underground reservoirs, are important for determining the amount of oil recovered by tertiary recovery.

Numerous studies have demonstrated that the use of surfactants can change both the interfacial tension between the water injected and the residual oil, and the wettability properties of the rock surfaces, so as to increase the recovery of the residual oil. In many cases, the addition of a polymer together with a surfactant, or immediately after the addition of the surfactant, can reduce the mobility ratio between the water injected and the residual oil, thus allowing the oil to be moved more easily towards the surface of the underground reservoir and to increase the recovery of the residual oil.

American patent U.S. Pat. No. 4,743,385, for example, describes a process for the improved recovery of oil from underground formations, which comprises injecting into said formations steam comprising an effective amount of a mixture including an anionic surfactant selected from a $C_{14-20}$ sulfonated alkyltoluene, a $C_{14-20}$ sulfonated ethylbenzene, or a $C_{14-20}$ sulfonated alkylbenzene; and a hydrotrope selected from the group consisting of xylene sulfonates of alkaline metals, toluene sulfonates of alkaline metals, cumene sulfonates of alkaline metals, benzene sulfonates of alkaline metals, isethionates of alkaline metals, butane sulfonates of alkaline metals and hexane sulfonates of alkaline metals.

American patent U.S. Pat. No. 6,022,834 describes a process for the recovery of residual oil from an underground reservoir, in which said residual oil contains organic acid components which are naturally present, which comprises the injection of a formulation of surfactants including "brine", alkalis and optionally polymers, said formulation being at a concentration higher than, equal to, or lower than, its critical micellar concentration, wherein said formulation is capable of creating a very low interfacial tension between the residual oil and said formation, allowing the alkali to permeate through the pores of the reservoir, and, therefore, putting them in contact and reacting them with said organic acid compounds naturally present in the reservoir, forming, in situ, a system of secondary surfactants comprising salts with surfactant properties which combine with said formulation of surfactants, thus allowing the entrapped residual oil to be emulsified, mobilized and brought to the surface.

American patent U.S. Pat. No. 7,055,602 describes a method for the treatment of a formation containing hydrocarbons, comprising: (a) providing a composition to at least a portion of said formation containing hydrocarbons, wherein said composition comprises branched aliphatic anionic surfactants and branched aliphatic non-ionic surfactants, wherein the branched aliphatic group of anionic surfactants comprises an average number of branchings for each aliphatic group ranging from about 0.7 to about 2.5; and (b) leaving said composition to interact with the hydrocarbons contained in said formation containing hydrocarbons.

American patent application U.S. 2008/0115945 describes a method for the enhanced recovery of oil or of other hydrocarbon present in underground formations with the use of an enzymatic fluid, comprising adding said enzymatic fluid to said formation; injecting water, steam or both; leaving said enzymatic fluid, water and/or steam a period of time necessary for soaking said formation; recovering said oil or other hydrocarbon by pumping or by other means.

American patent application U.S. 2008/0261835 describes a process for the recovery of heavy oil comprising: (a) injecting an aqueous injection fluid containing one or more surfactants into one or more injection wells so as to form an external pseudo-emulsion having a low viscosity with the heavy oil; (b) recovering the heavy oil from one or more production wells.

American patent application U.S. 2008/0302531 describes a process for the recovery of oils from underground reservoirs wherein an injection fluid comprising: (a) one or more arylakylsulfonates; (b) one or more co-surfactant(s); (c) one or more solvent(s); (d) optionally, one or more alkalis; and (e) optionally one or more viscosity agents, is injected into one or more injection well(s) and the oil is recovered from one or more production well(s).

The above processes, however, can have various drawbacks.

Emulsions can be formed, for example, between the fluid injected and the heavy oil present in the underground reservoir. The emulsions formed, in particular between the aqueous phase and the heavy oil, are particularly difficult to be broken once the emulsion is recovered at the surface, thus making the recovery of said heavy oil difficult. In many cases, in fact, heat treatment and/or demulsifying agents are necessary for breaking these emulsions. Furthermore, said emulsions can increase the viscosity of the fluid injected, reducing its injection capacity and can form blocks of emulsion in the underground reservoir which make difficult, if not impossible, to recover the oil. In the case of high salinity and/or hardness of the water present in the underground reservoir, moreover, the recovery of oil by means of fluids containing surfactants and/or polymers can be strongly limited due to the instability of said surfactants and/or polymers.

The Applicant has therefore considered the problem of finding a process which allows an improved recovery of heavy oil from an underground reservoir capable of overcoming the above-mentioned problems.

The Applicant has now found that the recovery of heavy oil from an underground reservoir can be advantageously carried out with the use of an oil-in-water nanoemulsion.

Numerous advantages have been obtained with the use of said oil-in-water nanoemulsion. The use of said oil-in-water nanoemulsion, for example, allows the interfacial tension between the water present in said oil-in-water nanoemulsion and the oil present in said underground reservoir to be reduced, favouring the miscibility between the oil present in said underground reservoir and the water present in said oil-in-water nanoemulsion.

In addition, the use of said oil-in-water nanoemulsion allows the wettability, of the surface of the rocks present in said underground reservoir to be changed, so as to reduce the capillary forces which entrap the oil present in the microscopic pores of the rocks present in said underground reservoir.

Furthermore, the use of said oil-in-water nanoemulsion allows the mobility ratio between the water present in said oil-in-water nanoemulsion and the oil present in said underground reservoir to be reduced thanks to the decrease in viscosity of the oil itself, thus allowing the oil to be moved more easily towards the surface of said underground reservoir and to increase the recovery yield of said oil.

The capacity of said oil-in-water nanoemulsion of reducing the viscosity of the oil present in said underground reservoir, also allows the reduction of the energy necessary for injecting said oil-in-water nanoemulsion into said underground reservoir and to operate also in the presence of rocks having a relatively low permeability.

Furthermore, with the use of said nanoemulsion, it is also possible to operate in the presence of water with a high salinity and/or hardness.

An object of the present invention therefore relates to a process for the recovery of heavy oil from an underground reservoir, comprising:
injecting an oil-in-water nanoemulsion into one or more injection wells;

recovering said heavy oil from one or more production wells.

Said one or more injection wells and said one or more production wells can be different. Alternatively, said one or more injection wells and said one or more production wells can be the same.

For the purpose of the present description and of the following claims, the term "heavy oil" refers to an oil having a high density, preferably lower than 25° API, more preferably ranging from 10° API to 20° API, said density being determined according to the Standard ASTM D287-92 (2006).

According to a preferred embodiment of the present invention, said heavy oil can have a dynamic viscosity, measured at the temperature of the reservoir, according to the Standard ASTM D7042-04, higher than or equal to 20 cP, preferably ranging from 22 cP to 150 cP.

For the purpose of the present description and of the following claims, the numerical ranges always include the extremes, unless otherwise specified.

According to a preferred embodiment of the present invention, said oil-in-water nanoemulsion can comprise a dispersed phase (i.e. oil) and a dispersing phase (i.e. water and surfactants).

According to a preferred embodiment of the present invention, in said oil-in-water nanoemulsion, the dispersed phase (i.e. oil) can be distributed in the dispersing phase (i.e. water and surfactants) in the form of droplets having a diameter ranging from 10 nm to 500 nm, preferably ranging from 15 nm to 200 nm.

Particularly useful oil-in-water nanoemulsions for the purposes of the above process, can be prepared as described in international patent application WO 2007/112967, whose content is incorporated herein as reference. Said process allows monodispersed oil-in-water nanoemulsions to be obtained, having a high stability and having the dispersed phase (i.e. oil) distributed in the dispersing phase (i.e. water and surfactants) in the form of droplets having a high specific area (area/volume) (i.e. a specific area higher than or equal to 6,000 $m^2/l$).

According to a preferred embodiment of the present invention, said oil-in-water nanoemulsions can be prepared according to a process comprising:
the preparation of a homogeneous water/oil mixture (1) characterized by an interfacial tension lower than or equal to 1 mN/m, preferably ranging from $10^{-2}$ mN/m to $10^{-4}$ mN/m, comprising water in an amount ranging from 65% by weight to 99.9% by weight, preferably ranging from 70% by weight to 90% by weight, with respect to the total weight of said mixture (1), at least two surfactants having a different HLB selected from non-ionic, anionic, polymeric surfactants, preferably non-ionic, said surfactants being present in such an amount as to make said mixture (1) homogeneous;
the dilution of said mixture (1) in a dispersing phase consisting of water with the addition of at least one surfactant selected from non-ionic, anionic, polymeric surfactants, preferably non-ionic, the amount of said dispersing phase and of said surfactant being such as to obtain an oil-in-water nanoemulsion having a HLB value higher than that of said mixture (1).

According to a preferred embodiment of the present invention, said oil-in-water nanoemulsions can have a HLB value higher than or equal to 9, preferably ranging from 10 to 16.

According to a preferred embodiment of the present invention, in said oil-in-water nanoemulsions the dispersed phase (i.e. oil) can be distributed in the dispersing phase (i.e. water) in the form of droplets having a specific area (area/volume) ranging from 6,000 m$^2$/l to 300,000 m$^2$/l, preferably ranging from 15,000 m$^2$/l to 200,000 m$^2$/l.

According to a preferred embodiment of the present invention, said oil-in-water nanoemulsions can include an amount of surfactants ranging from 0.1% by weight to 20% by weight, preferably ranging from 0.25% by weight to 12% by weight, and an amount of oil ranging from 0.5% by weight to 10% by weight, preferably ranging from 1% by weight to 8% by weight, with respect to the total weight of said oil-in-water nanoemulsion.

According to a preferred embodiment of the present invention, said surfactants can be selected from non-ionic surfactants, such as, for example, alkylpolyglucosides; esters of fatty acids of sorbitan; polymeric surfactants such as, for example grafted acrylic copolymers having a backbone of polymethylmethacrylate-methacrylic acid and side chains of polyethylene glycol; or mixtures thereof.

According to a preferred embodiment of the present invention, the oil of said nanoemulsion can be selected from aromatic hydrocarbons, such as, for example, xylene, mixtures of isomers of xylene, toluene, benzene, or mixtures thereof; linear, branched or cyclic hydrocarbons, such as, for example, hexane, heptane, decane, cyclohexane, or mixtures thereof; complex mixtures of hydrocarbons, such as, for example, gas oil, kerosene, soltrol, mineral spirit, or mixtures thereof; or mixtures thereof.

As far as the water used for the preparation of said nanoemulsion is concerned, the same can be of any kind. For economical reasons, it is preferable for said water to be present near the preparation site of said oil-in-water nanoemulsions.

According to a preferred embodiment of the present invention, demineralized water, salt water, water with additives, or mixtures thereof, can be used for the preparation of said nanoemulsions. More specifically, the water present in said underground reservoir can be used.

The oil present in said underground reservoir can optionally include other compounds, such as, for example, compounds containing oxygen, such as naphthenic acids; halogen containing compounds; compounds containing metal elements; nitrogen containing compounds; sulfur containing compounds; or mixtures thereof.

In order to saponify the naphthenic acids generally present in said solid matrix, at least one base can be added to said oil-in-water nanoemulsion.

According to a further embodiment of the present invention, at least one base can be added to said oil-in-water nanoemulsion, in an amount ranging from 0.1% by weight to 10% by weight, preferably ranging from 0.2% by weight to 5% by weight, with respect to the total weight of said oil-in-water nanoemulsion. Preferably said base can be selected from sodium hydroxide, potassium hydroxide, sodium carbonate, potassium carbonate, or mixtures thereof.

In order to recover said heavy oil from one or more production well(s), said oil-in-water nanoemulsion is injected into said one or more injection well(s) for a certain period of time, at a certain temperature, which depends on the type of underground reservoir (e.g., on the type of rocks present in the underground reservoir), and also on the dimensions and distance of said one or more injection well(s) from said one or more production well(s).

According to a preferred embodiment of the present invention, said oil-in-water nanoemulsion can be injected into one or more injection well(s) for a time ranging from 80 days to 200 days, preferably ranging from 90 days to 180 days.

According to a preferred embodiment of the present invention, said oil-in-water nanoemulsion can be injected into one or more injection well(s) at a temperature ranging from 10° C. to 100° C., preferably ranging from 20° C. to 90° C.

In order to recover a higher amount of heavy oil, a secondary recovery can be advantageously carried out, preferably through the injection of water (water flooding).

According to a preferred embodiment of the present invention, said process can include, before the injection of said oil-in-water nanoemulsion, the injection of water (water flooding) into said one or more injection well(s).

With respect to the water which can be used in said injection (water flooding), the same can be of any origin. For economical reasons, it is advisable for this water to be available near the injection site.

According to a preferred embodiment of the present invention, demineralized water, salt water, water with additives, or mixtures thereof, can be used. More specifically, the water present in said underground reservoir can be used.

In order to recover an higher amount of heavy oil, it can be advantageous to inject water and/or at least one polymer into said one or more injection well(s), after the injection of said oil-in-water nanoemulsion.

According to a preferred embodiment of the present invention, said process can include, after the injection of said oil-in-water nanoemulsion, the injection of water and/or of at least one polymer into said one or more injection well(s).

As far as the water which can be used in said injection is concerned, the same can be of any origin. For economical reasons, it is advisable for this water to be available near the injection site.

According to a preferred embodiment of the present invention, demineralized water, salt water, water with additives, or mixtures thereof, can be used. More specifically, the water present in said underground reservoir can be used.

According to a preferred embodiment of the present invention, said polymer can be selected, for example, from polyacrylamides, sulfonated copolymers of acrylamide, xanthan gum, or mixtures thereof.

The recovery of said heavy oil from said one or more production well(s) is carried out as the injection of said oil-in-water nanoemulsion into said one or more injection well(s), proceeds.

The heavy oil recovered through the process object of the present invention, can be sent to subsequent treatments such as, for example, upgrading via hydrogenation or hydrocracking, in order to obtain hydrocarbon fractions having a higher commercial value.

The present invention will be now illustrated through an illustrative embodiment with reference to FIG. 1 provided below.

FIG. 1 schematically represents an embodiment of the process object of the present invention. The underground reservoir (1) with the particles of heavy oil (2) is subjected to the process of the present invention. For this purpose, an oil-in-water nanoemulsion (4) is injected into the injection well (3).

Said nanoemulsion (4) is injected into the injection well (3) for a time preferably ranging from days to 180 days, at a temperature preferably ranging from 10° C. to 100° C.

Said heavy oil (6) is recovered from the production well (5), as the injection of said nanoemulsion (4) into said injection well (3) proceeds. Said heavy oil (6) can be sent to subsequent upgrading treatments (not shown in FIG. 1).

Some illustrative and non-limiting examples are provided hereunder for a better understanding of the present invention and for the embodiment of the same.

EXAMPLE 1

(1) Preparation of the Precursor of the Oil-in-Water Nanoemulsion 0.121 g of ATLOX 4913 (graft copolymer polymethyl methacrylate-polyethyleneglycol of Uniqema), 0.769 g of SPAN 80 (sorbitan monooleate of Fluka), 3.620 g of GLUCOPONE 600 CS UP (alkylpolyglucoside of Fluka, 50% water solution) and 6.150 g of xylene, were added to a magnetically stirred 50 ml beaker and the whole mixture was maintained under stirring until complete dissolution. Once the dissolution was complete, 4.340 g of deionized water were added and the mixture was maintained under gentle stirring for two hours, obtaining 15 g of precursor having a HLB value equal to 12.80.

Said precursor is left to stabilize for 24 hrs at room temperature (25° C.) before use.

(2) Preparation of the Oil-in-Water Nanoemulsion 0.325 g of GLUCOPONE 215 CS UP (alkylpolyglucoside of Fluka, 60% water solution) and 2.236 g of deionized water, were added to a 20 ml glass vial and the whole mixture was maintained under stirring until complete dissolution. Once the dissolution was complete, 2.439 g of the precursor obtained as described above were added and the whole mixture was maintained under stirring for two hours obtaining a nanoemulsion having a transparent/translucent appearance, a HLB value of 13.80 and a xylene content equal to 20% by weight with respect to the total weight of the nanoemulsion.

Said nanoemulsion was diluted with 96.25 ml of deionized water in order to obtain a nanoemulsion having a total surfactants content equal to 1.25% by weight with respect to the total weight of the nanoemulsion and a xylene content equal to 2.5% by weight with respect to the total weight of the nanoemulsion.

The nanoemulsion obtained as described above has droplets of dispersed phase (xylene) having dimensions ranging from 40 to 60 nm, a polydispersity index lower than 0.2 and is stable for over 6 months.

EXAMPLE 2

A steel column (1.4 cm×10 cm) was filled with 26.6 g of sand coming from the oil reservoir of Aghar (Egypt) and subsequently flushed with brine, obtaining a packed column ("sand pack"). After flushing with brine of said packed column ("sand pack"), the following measurements were carried out: permeability to brine, which proved to be equal to 0.09 D (darcy) and the porosity which proved to be equal to 42% (corresponding to a PV (Pore Volume) equal to 6.5 ml).

The packed column ("sand pack") obtained as described above, was subsequently saturated with 5.0 ml of oil coming from the reservoir of Aghar (Egypt) having a dynamic viscosity, measured at the temperature of the reservoir, i.e. 77° C., according to the Standard ASTM D7042-04, equal to 64 cP, corresponding to an initial oil saturation of 77.3% of the PV (pore volume).

After maintaining the packed column ("sand pack") saturated with oil at 77° C., for seven days, the column was flushed with 3 PV (pore volume) of brine (water flooding) and 3.5 ml of oil were recovered (equal to 70.3% with respect to the oil present in the saturated column). The brine flow was equal to 0.1 ml/min.

After flushing with brine, the amount of residual oil in the packed column ("sand pack") was equal to 29.7% of the PV (pore volume).

The packed column ("sand pack") was then flushed with 1 PV (pore volume) of the nanoemulsion prepared according to Example 1 and, subsequently, with 4 PV (pore volume) of brine, and 1.1 ml of oil were recovered [equal to 73.3% with respect to the oil present in the packed column ("sand pack") after flushing with brine]. The nanoemulsion flow was equal to 0.1 ml/min.

In order to recover the residual oil and to be able to close the balance of the material, the packed column ("sand pack") was flushed with 10 PV (pore volume) of tetrahydrofuran and 0.4 ml of oil [equal to 100% with respect to the oil present in the packed column ("sand pack") after flushing with nanoemulsion] were recovered. The tetrahydrofuran flow was equal to 0.2 ml/min.

The amount of oil recovered after the flushing was determined by extraction of the oil/water fractions with tetrahydrofuran and subsequent spectrophotometric dosage at 446 nm.

The invention claimed is:

1. A process for the recovery of heavy oil from an underground reservoir, comprising:
   injecting an oil-in-water nanoemulsion into one or more injection wells; and
   recovering the heavy oil from one or more production wells,
   wherein
   the oil-in-water nanoemulsion contacts the heavy oil in the underground reservoir and reduces interfacial tension between the heavy oil in the underground reservoir and the water in the oil-in-water nanoemulsion and reduces the viscosity of the heavy oil in the underground reservoir, and
   the oil in the oil-in-water nanoemulsion is selected from the group consisting of aromatic hydrocarbons.

2. The process for the recovery of heavy oil from an underground reservoir according to claim 1, wherein the one or more injection wells and the one or more production wells are different.

3. The process for the recovery of heavy oil from an underground reservoir according to claim 1, wherein the one or more injection wells and the one or more production wells are the same.

4. The process for the recovery of heavy oil from an underground reservoir according to claim 1, wherein the heavy oil has a dynamic viscosity, measured at the reservoir temperature higher than or equal to 20 cP.

5. The process for the recovery of heavy oil from an underground reservoir according to claim 4, wherein the heavy oil has a dynamic viscosity, measured at the reservoir temperature ranging from 22 cP to 150 cP.

6. The process for the recovery of heavy oil from an underground reservoir according to claim 1, wherein in the oil-in-water nanoemulsion, the dispersed oil phase is distributed in the dispersing water phase in the form of droplets having a diameter ranging from 10 nm to 500 nm.

7. The process for the recovery of heavy oil from an underground reservoir according to claim 6, wherein in the oil-in-water nanoemulsion, the dispersed oil phase is distributed in the dispersing water phase in the form of droplets having a diameter ranging from 15 nm to 200 nm.

8. The process for the recovery of heavy oil from an underground reservoir according to claim 1, wherein the oil-in-water nanoemulsion is prepared according to a process comprising:
preparing a homogeneous water/oil mixture (1) having an interface tension lower than or equal to 1 mN/m, comprising water in an amount ranging from 65% by weight to 99.9% by weight, with respect to the total weight of the mixture (1), at least two surfactants having a different HLB, selected from non-ionic, anionic, polymeric surfactants, wherein the mixture (1) is homogeneous;
diluting the mixture (1) in a dispersing phase comprising water and at least one surfactant selected from the group consisting of non-ionic, anionic, polymeric surfactants, the amount of the dispersing phase and of the surfactant being such as to obtain an oil-in-water nanoemulsion having a HLB higher than that of the mixture (1).

9. The process for the recovery of heavy oil from an underground reservoir according to claim 1, wherein the oil-in-water nanoemulsion has a HLB value higher than or equal to 9.

10. The process for the recovery of heavy oil from an underground reservoir according to claim 9, wherein the oil-in-water nanoemulsion has a HLB value ranging from 10 to 16.

11. The process for the recovery of heavy oil from an underground reservoir according to claim 1, wherein in the oil-in-water nanoemulsion, the dispersed oil phase is distributed in the dispersing water phase in the form of droplets having a specific area (area/volume) ranging from 6,000 $m^2/l$ to 300,000 $m^2/l$.

12. The process for the recovery of heavy oil from an underground reservoir according to claim 11, wherein in the oil-in-water nanoemulsion, the dispersed oil phase is distributed in the dispersing water phase in the form of droplets having a specific area (area/volume) ranging from 15,000 $m^2/l$ to 200,000 $m^2/l$.

13. The process for the recovery of heavy oil from an underground reservoir according to claim 1, wherein the oil-in-water nanoemulsion comprises an amount of surfactants ranging from 0.1% by weight to 20% by weight with respect to the total weight of the oil-in-water nanoemulsion.

14. The process for the recovery of heavy oil from an underground reservoir according to claim 13, wherein the oil-in-water nanoemulsion comprises an amount of surfactants ranging from 0.25% by weight to 12% by weight with respect to the total weight of the oil-in-water nanoemulsion.

15. The process for the recovery of heavy oil from an underground reservoir according to claim 1, wherein the oil-in-water nanoemulsion comprises an amount of oil ranging from 0.5% by weight to 10% by weight with respect to the total weight of the oil-in-water nanoemulsion.

16. The process for the recovery of heavy oil from an underground reservoir according to claim 1, wherein the oil-in-water nanoemulsion comprises an amount of oil ranging from 1% by weight to 8% by weight with respect to the total weight of the oil-in-water nanoemulsion.

17. The process for the recovery of heavy oil from an underground reservoir according to claim 13, wherein the surfactants are non-ionic surfactants selected from the group consisting of alkyl polyglucosides; esters of fatty acids of sorbitan; polymeric surfactants such as grafted acrylic copolymers having a backbone of polymethylmethacrylate-methacrylic acid and side chains of polyethylene glycol, and mixtures thereof.

18. The process for the recovery of heavy oil from an underground reservoir according to claim 1, wherein the oil of the nanoemulsion is selected from the group consisting of xylene, mixtures of xylene isomers, toluene, benzene and mixtures thereof.

19. The process for the recovery of heavy oil from an underground reservoir according to claim 1, wherein the water of the nanoemulsion is selected from demineralized water, salt water, water with additives, or mixtures thereof.

20. The process for the recovery of heavy oil from an underground reservoir according to claim 1, wherein the water of the nanoemulsion is water present in the underground reservoir.

21. The process for the recovery of heavy oil from an underground reservoir according to claim 1, wherein at least one base is added to the oil-in-water nanoemulsion in an amount ranging from 0.1% by weight to 10% by weight with respect to the total weight of the oil-in-water nanoemulsion.

22. The process for the recovery of heavy oil from an underground reservoir according to claim 21, wherein at least one base is added to the oil-in-water nanoemulsion in an amount ranging from 0.2% by weight to 5% by weight with respect to the total weight of the oil-in-water nanoemulsion.

23. The process for the recovery of heavy oil from an underground reservoir according to claim 21, wherein the base is selected from sodium hydroxide, potassium hydroxide, sodium carbonate, potassium carbonate, or mixtures thereof.

24. The process for the recovery of heavy oil from an underground reservoir according to claim 1, wherein the oil-in-water nanoemulsion is injected into one or more injection wells for a time ranging from 80 days to 200 days.

25. The process for the recovery of heavy oil from an underground reservoir according to claim 24, wherein the oil-in-water nanoemulsion is injected into one or more injection wells for a time ranging from 90 days to 180 days.

26. The process for the recovery of heavy oil from an underground reservoir according to claim 1, wherein the oil-in-water nanoemulsion is injected into one or more injection wells at a temperature ranging from 10° C. to 100° C.

27. The process for the recovery of heavy oil from an underground reservoir according to claim 26, wherein the oil-in-water nanoemulsion is injected into one or more injection wells at a temperature ranging from 20° C. to 90° C.

28. The process for the recovery of heavy oil from an underground reservoir according to claim 1, wherein the process comprises, before the injection of the oil-in-water nanoemulsion, injecting water into the one or more injection wells.

29. The process for the recovery of heavy oil from an underground reservoir according to claim 28, wherein the water is selected from demineralized water, salt water, water with additives, or mixtures thereof.

30. The process for the recovery of heavy oil from an underground reservoir according to claim 28, wherein the water is water present in the underground reservoir.

31. The process for the recovery of heavy oil from an underground reservoir according to claim 1, wherein the process comprises, after the injection of the oil-in-water nanoemulsion, injecting water, at least one polymer or both into the one or more injection wells.

32. The process for the recovery of heavy oil from an underground reservoir according to claim 31, wherein the water is selected from demineralized water, salt water, water with additives, or mixtures thereof.

33. The process for the recovery of heavy oil from an underground reservoir according to claim 32, wherein the water is water present in the underground reservoir.

34. The process for the recovery of heavy oil from an underground reservoir according to claim 31, wherein the polymer is selected from polyacrylamides, sulfonated copolymers of acrylamide, xantham gum, or mixtures thereof.

35. The process according to claim 1, further comprising hydrogenating or hydrocracking the recovered heavy oil.

36. The process according to claim 1, wherein the heavy oil has a density of lower than 25° API.

37. The process according to claim 1, wherein the heavy oil has a density in the range of 10° API up to less than 25° API.

38. The process according to claim 1, wherein the heavy oil has a density in the range of 10° API up to 20° API.

39. The process according to claim 1, wherein the oil-in-water nanoemulsion reduces capillary forces which entrap oil present in microscopic pores of rocks present in the underground reservoir.

40. The process according to claim 1, wherein the oil-in-water nanoemulsion reduces the mobility ratio between the heavy oil in the underground reservoir and the water in the oil-in-water nanoemulsion.

41. The process according to claim 1, wherein the reduced interfacial tension between the heavy oil in the underground reservoir and the water in the oil-in-water nanoemulsion favors the miscibility between the heavy oil in the underground reservoir and the water in the oil-in-water nanoemulsion.

42. The process according to claim 1, wherein the oil-in-water nanoemulsion reduces the amount of energy necessary to inject the oil-in-water nanoemulsion into the underground reservoir.

43. The process according to claim 1, wherein the reduced viscosity of the heavy oil allows the heavy oil to move more easily towards a surface of the underground reservoir and provide increased recovery yield of the heavy oil.

44. The process according to claim 1, wherein
the oil-in-water nanoemulsion reduces capillary forces which entrap oil present in microscopic pores of rocks present in the underground reservoir, and reduces the mobility ratio between the heavy oil in the underground reservoir and the water in the oil-in-water nanoemulsion, wherein
the reduced interfacial tension between the heavy oil in the underground reservoir and the water in the oil-in-water nanoemulsion favors the miscibility between the heavy oil in the underground reservoir and the water in the oil-in-water nanoemulsion, and reduces the amount of energy necessary to inject the oil-in-water nanoemulsion into the underground reservoir, allowing the heavy oil to be moved more easily towards a surface of the underground reservoir and providing increased recovery yield of the heavy oil.

* * * * *